(12) United States Patent
Dupont et al.

(10) Patent No.: US 9,126,166 B2
(45) Date of Patent: Sep. 8, 2015

(54) METHOD FOR FILLING A MULTITUBE CATALYTIC REACTOR

(71) Applicant: Arkema France, Colombes (FR)

(72) Inventors: Nicolas Dupont, Saint Avold (FR);
Emmanuel Lambert, Altrippe (FR);
Arnaud Souet, Metz (FR); David Urbaniak, Lelling (FR)

(73) Assignee: Arkema France, Colombes (FR)

( * ) Notice: Subject to any disclaimer, the term of this patent is extended or adjusted under 35 U.S.C. 154(b) by 24 days.

(21) Appl. No.: 14/231,795

(22) Filed: Apr. 1, 2014

(65) Prior Publication Data

US 2014/0290788 A1 Oct. 2, 2014

(30) Foreign Application Priority Data

Apr. 2, 2013 (FR) ...................................... 13 52952

(51) Int. Cl.
*B01J 8/00* (2006.01)
*B01J 8/06* (2006.01)

(52) U.S. Cl.
CPC *B01J 8/004* (2013.01); *B01J 8/003* (2013.01); *B01J 8/06* (2013.01); *B01J 2208/00752* (2013.01); *B01J 2208/025* (2013.01)

(58) Field of Classification Search
CPC .. B01J 8/003; B01J 8/004; B01J 2208/00752; B01J 8/06
USPC ............. 141/1, 234, 237, 285, 286, 331, 369, 141/374, 390; 422/219
See application file for complete search history.

(56) References Cited

U.S. PATENT DOCUMENTS

| | | | |
|---|---|---|---|
| 6,409,977 B2 | 6/2002 | Harper et al. | |
| 6,880,591 B2 * | 4/2005 | Goemans et al. | 141/286 |
| 6,905,660 B2 | 6/2005 | Harper et al. | |
| 7,285,251 B2 | 10/2007 | Johns et al. | |
| 7,458,401 B2 | 12/2008 | Johns et al. | |
| 7,836,919 B2 * | 11/2010 | Johns et al. | 141/1 |
| 8,336,586 B2 * | 12/2012 | Johns | 141/337 |
| 8,578,978 B2 * | 11/2013 | Sanz et al. | 141/237 |
| 2011/0017348 A1 * | 1/2011 | Tanimoto et al. | 141/5 |

* cited by examiner

*Primary Examiner* — Timothy L Maust
*Assistant Examiner* — Timothy P Kelly
(74) *Attorney, Agent, or Firm* — Lynn B. Morreale

(57) ABSTRACT

The present invention relates to a method for filling a multitube catalytic reactor and to a set of inserts suited to implementing this method.

The method of the invention is based on the use of inserts of different types allowing superposed layers of catalysts to be placed in the reaction compartments. The heads of the inserts are visually distinct according to the type of insert, making it possible to avoid filling errors and thus allowing the various layers of catalyst to be filled reliably and simultaneously on a reactor scale.

16 Claims, 3 Drawing Sheets

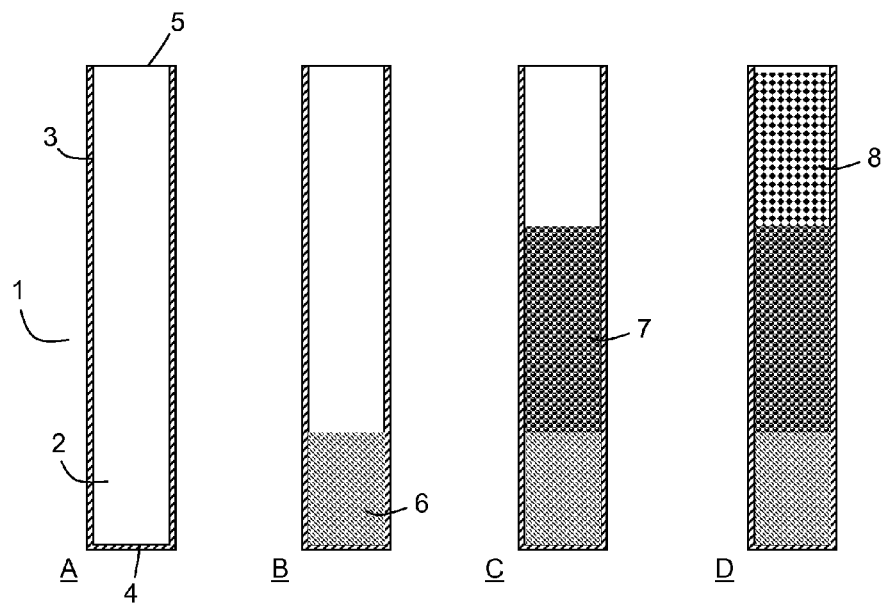
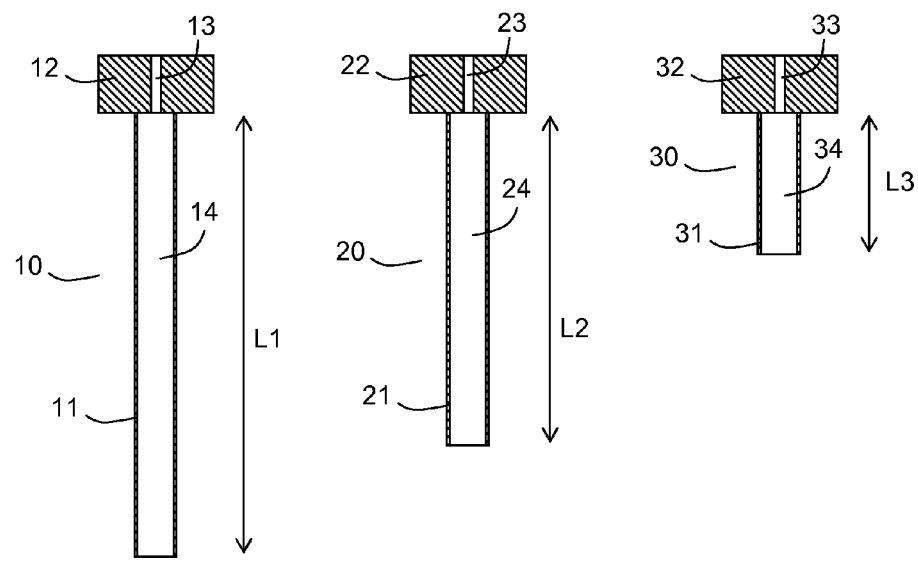
Fig. 1
Fig. 2

METHOD FOR FILLING A MULTITUBE CATALYTIC REACTOR

CROSS REFERENCE TO RELATED APPLICATIONS

This application claims benefit to French patent application FR No. 13.52952, filed on Apr. 2, 2013.

FIELD OF THE INVENTION

The present invention relates to a method for filling a multitube catalytic reactor and to a set of inserts suited to implementing this method.

BACKGROUND

Multitube catalytic reactors may comprise several tens of thousands of tubes, which constitute as many reaction compartments. Because the catalyst becomes deactivated over time, it is necessary periodically to replace the catalyst, i.e. to empty the tubes and fill the tubes with fresh catalyst.

This is a complex operation which may take several weeks to complete properly, representing a significant cost to the operator. It is therefore desirable for the method of filling the reactor to be as rapid as possible.

One of the main constraints on the operation is the need to meter precisely the quantity of catalyst (generally in granular form) in each reaction tube. Any heterogeneity between the filling of the various tubes in fact leads to a difference in pressure drop between reactor compartments, hence reducing efficiency. It also makes it possible to avoid any preferred passage of reaction gas or any bypassing of catalyst in the tube.

Document EP 0 963 785 describes a filling device for introducing granular catalyst into reaction tubes. The device is fixed to the inlet of the tubes and channels a stream of catalysts introduced into the tubes.

Document EP 1 654 054 describes filling sleeves that allow controls on the height of the catalyst inside the reaction tubes.

However, catalytic reactors often contain two or even three layers of different catalysts. These layers need to be placed in the reaction tubes in a precise order and with well-defined layer thicknesses. Now, the prior art does not allow satisfactory management of the filling of a multitube reactor with several catalysts, notably when, in order to speed up the filling process, it is desirable to fill the various catalysts simultaneously on a reactor scale.

There is therefore a need to develop a method for filling a reactor with a plurality of catalysts that is more effective and/or more rapid than in the prior art.

SUMMARY OF THE INVENTION

The invention relates first of all to a method for filling a catalytic reactor comprising a plurality of tubular reaction compartments having an inlet and a closed end, the method comprising the following steps:
 a) placing a layer of a first catalyst in the closed end of the tubular reaction compartments;
 b) placing a layer of a second catalyst in the tubular reaction compartments on top of the layer of first catalyst;
the first catalyst and the second catalyst being granular catalysts; in which:
 step a) involves inserting first inserts into the tubular reaction compartments then introducing the first catalyst into the first inserts, each first insert comprising:
  a tubular body designed to be introduced into a tubular reaction compartment,
  a head designed to collaborate with the inlet of the tubular reaction compartment in order to hold the first insert in place,
  the head being provided with a longitudinal through-passage communicating with the inside of the tubular body;
 step b) involves inserting second inserts into the tubular reaction compartments then introducing the second catalyst into the second inserts, each second insert comprising:
  a tubular body designed to be introduced into a tubular reaction compartment,
  a head designed to collaborate with the inlet of the tubular reaction compartment in order to hold the second insert in place,
  the head being provided with a longitudinal through-passage communicating with the inside of the tubular body;
 the tubular bodies of the first inserts having a longitudinal dimension (L1) greater than the longitudinal dimension (L2) of the tubular bodies of the second inserts;
 the heads of the first inserts being visually distinct from the heads of the second inserts; and
 the first inserts being removed before the second inserts are inserted.

According to one embodiment, the method further comprises the following step:
 c) placing a layer of a third catalyst in the tubular reaction compartments on top of the layer of second catalyst;
the third catalyst being a granular catalyst;
in which:
 step c) involves inserting third inserts into the tubular reaction compartments then introducing the third catalyst into the third inserts, each third insert comprising:
  a tubular body designed to be introduced into a tubular reaction compartment,
  a head designed to collaborate with the inlet of the tubular reaction compartment in order to hold the third insert in place,
  the head being provided with a longitudinal through-passage communicating with the inside of the tubular body;
 the tubular bodies of the second inserts having a longitudinal dimension (L2) greater than the longitudinal dimension (L3) of the tubular bodies of the third inserts;
 the heads of the third inserts being visually distinct from the heads of the first inserts and from the heads of the second inserts; and
 the second inserts being removed before the third inserts are inserted.

According to one embodiment, the heads of the first, second and, where applicable, third, inserts are different colours.

According to one embodiment, the heads of the first, second and, where applicable, third, inserts have a cross section of polygonal shape, preferably hexagonal; and/or the heads of the first inserts when the first catalyst is being introduced, the heads of the second inserts when the second catalyst is being introduced, and, where applicable, the heads of the third inserts when the third catalyst is being introduced, are contiguous.

According to one embodiment, each step a), b), and, where applicable, c), comprises, after the first, second or third catalyst has been introduced, the removal of the first, second or third inserts, followed by the reinsertion of the first, second or third inserts in the tubular reaction compartments butting up against the layer of first catalyst, the layer of second catalyst or the layer of third catalyst. This reinsertion is aimed at being able to check the level of catalyst actually present in the tubes, for example using an external marking made on each insert.

According to one embodiment, steps a), b), and, where applicable, c), are carried out at least partially concurrently in various tubular reaction compartments of the reactor.

According to one embodiment, the reactor is divided into sections, each step a), b), and, where applicable, c), being performed simultaneously for all of the tubular reaction compartments of each section.

Another subject of the invention is a set of inserts for filling a catalytic reactor comprising a plurality of tubular reaction compartments, the set of inserts comprising first inserts and second inserts, in which each first insert and each second insert comprises:
- a tubular body designed to be introduced into a tubular reaction compartment,
- a head designed to collaborate with an inlet of the tubular reaction compartment in order to hold the insert in place,
- the head being provided with a longitudinal through-passage communicating with the inside of the tubular body;
the tubular bodies of the first inserts having a longitudinal dimension (L1) greater than the longitudinal dimension (L2) of the tubular bodies of the second inserts, and the heads of the first inserts being visually distinct and different colours from the heads of the second inserts.

The set of inserts according to the invention may further comprise third inserts, in which each third insert comprises:
- a tubular body designed to be introduced into a tubular reaction compartment,
- a head designed to collaborate with an inlet of the tubular reaction compartment in order to hold the insert in place,
- the head being provided with a longitudinal through-passage communicating with the inside of the tubular body;
the tubular bodies of the second inserts having a longitudinal dimension (L2) greater than the longitudinal dimension (L3) of the tubular bodies of the third inserts, and the heads of the third inserts being visually distinct and different colours from the heads of the first inserts and of the second inserts.

The set of inserts according to the invention is suited to implementation of the method as described hereinabove.

The present invention makes it possible to overcome the disadvantages of the prior art. It more particularly provides a method for filling a reactor with a plurality of catalysts that is more effective and/or more rapid than in the prior art.

This is achieved by virtue of the use of inserts of different types allowing superposed layers of catalysts to be placed in the reaction compartments. The heads of the inserts are visually distinct according to the type of insert, making it possible to avoid filling errors and thus allowing reliable filling of the various layers of catalysts simultaneously on a reactor scale.

BRIEF DESCRIPTION OF THE FIGURES

FIG. 1 is a view in cross section of a tubular reaction compartment at various stages of filling.

FIG. 2 is a view in cross section of a set of inserts according to the invention.

DESCRIPTION OF EMBODIMENTS OF THE INVENTION

Figure 3:
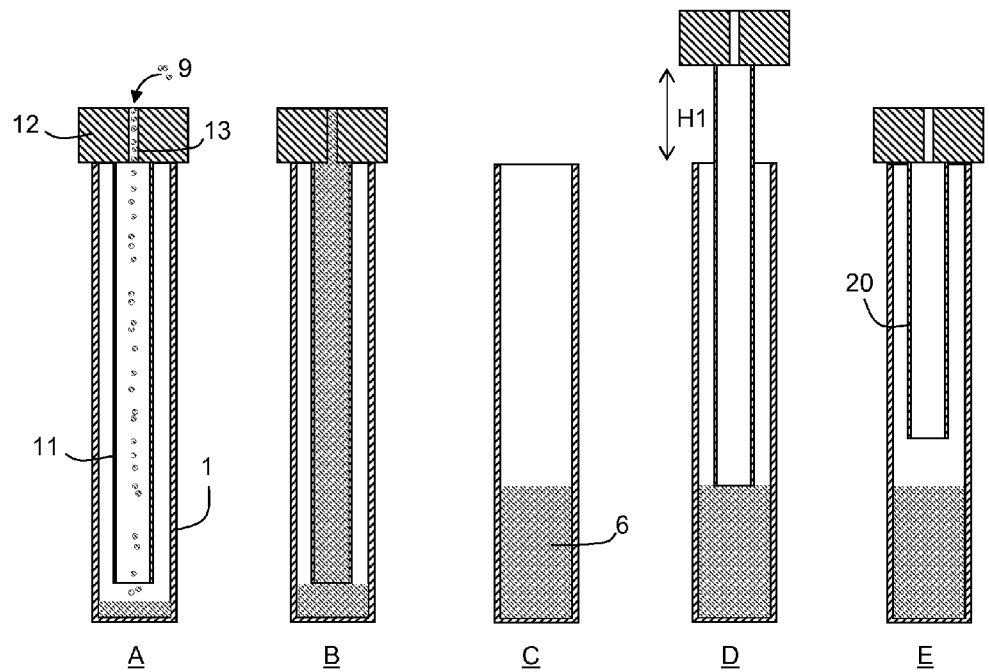
FIG. 3 is a view in cross section illustrating the successive steps in the filling of a layer of catalyst into a tubular reaction compartment.

The invention is now described in greater detail and non-limitingly in the description which follows.

With reference to FIG. 1, a multitube catalytic reactor comprises a plurality of tubular reaction compartments 1. An empty tubular reaction compartment 1 is depicted in view A. Each tubular reaction compartment 1 comprises a wall 3 which delimits an interior space 2 intended to accept the catalysts and in which the desired reaction or reactions takes or take place, when the reactor is in operation. The interior space 2 is a volume which is generally a cylinder, preferably a right cylinder, preferably of circular cross section. The axis of the corresponding cylinder is referred to as the longitudinal axis of the compartment 1.

In general, the longitudinal axes of all the compartments 1 are aligned, preferably with the vertical. The compartments 1 thus form a grid pattern within the reactor, preferably defining an equilateral triangle spacing (in order to optimize compactness), but which could, if appropriate, be of a different type, for example square.

The reactor may for example comprise from 10 to 1 000 000 compartments, preferably from 10 to 100 000 compartments, and notably from 1 000 to 50 000 compartments, more particularly from 10 000 to 30 000 compartments.

Each compartment 1 comprises a closed end 4 (for example a perforated plate of tripod type or a spring) and an inlet 5 which is an end that is open (when the reactor is open). The reagent feed and product collection systems, and the heat exchange system, are not detailed here and are known per se.

According to the invention, each compartment 1 has to be filled with at least two different catalysts or, in the example illustrated, with three catalysts. It should be understood that in certain embodiments of the invention, more than three catalysts (for example four) are used. In that case, the operations described here need merely be repeated in a similar way accordingly.

Views B, C and D depict a compartment 1 at various stages of filling, namely, respectively: with a layer of first catalyst 6 placed on the closed end 4 of the compartment 1; with also a layer of second catalyst 7 placed on top of the layer of first catalyst 6; and with also a layer of third catalyst 8 placed on top of the layer of second catalyst 7. Each catalyst is in granular form (beads, granules, other types of granulation, but is generally not a powder). Each catalyst may be a single catalyst or a mixture of catalysts, in which case the composition of the mixture differs from one layer to the other.

In order to fill a compartment 1 according to the sequence of steps illustrated in FIG. 1, the invention proposes a set, or kit, of inserts, which is depicted in FIG. 2.

The set comprises at least one first insert 10 (a one-off or preferably several of them) and a second insert 20 (a one-off or preferably several of them). In the example illustrated, the set also comprises a third insert 30 (as a one-off or preferably several of them). In general, the number of different inserts corresponds to the number of layers of catalyst that are to be placed in the reactor. Each insert 10, 20, 30 is designed to allow a compartment 1 to be filled with one of the layers of catalyst.

Each insert 10, 20, 30 comprises a tubular body 11, 21, 31 and a head 12, 22, 32. The tubular body 11, 21, 31 comprises a tubular wall directed along a longitudinal axis. For preference, the tubular body 11, 21, 31 is of cylindrical shape, and more particularly of right cylindrical shape, preferably with a cross section (i.e. a cross section perpendicular to the longitudinal axis) that is circular.

The tubular wall defines an opening 14, 24, 34 of the tubular body 11, 21, 31. At one of its longitudinal ends, the tubular body 11, 21, 31 is connected to a head 12, 22, 32 forming a shoulder. In other words, the head 12, 22, 32 has a cross section greater than that of the tubular body 11, 21, 31.

The head 12, 22, 32 comprises a longitudinal passage 13, 23, 33 which is aligned with the longitudinal axis of the tubular body 11, 21, 31 and which communicates with the opening 14, 24, 34 of the tubular body 11, 21, 31. The insert is generally open, i.e. both the opposite end of the opening 14, 24, 34 to the head 12, 22, 32 and the opposite end of the passage 13, 23, 33 from the tubular body 11, 21, 31 are open ends.

The transverse internal dimension of the passage 13, 23, 33 (for example the diameter in the case of a passage of circular cross section) is generally smaller than the dimension of the opening 14, 24, 34.

The first, second and third inserts 10, 20, 30 generally have the same shape, except that their tubular bodies 11, 21, 31 are of different lengths. The length of the tubular body 11, 21, 31 corresponds to the distance between the opposite end of the tubular body 11, 21, 31 from the head 12, 22, 32 and the point where the tubular body 11, 21, 31 and the head 12, 22, 32 are joined.

The length L1 of the first insert 10 is greater than the length L2 of the second insert 20 which is itself greater than the length L3 of the third insert 30 (and so on, in the event of there being additional inserts).

However, it is also possible to plan for the inserts 10, 20, 30 to have other differences in shape, for example regarding the transverse dimension of the tubular bodies 11, 21, 31, the wall thickness of the tubular bodies 11, 21, 31 and especially the transverse dimension of the longitudinal passages 13, 23, 33 which may advantageously be adapted to the size of the particles of catalyst, as explained hereinbelow.

By way of illustration, the first inserts 10 may have a length L1 of 1.5 to 2.5 m, for example of 1.8 to 2.2 m; the second inserts 20 may have a length L2 of 1 to 2 m, for example of 1.2 to 1.8 m; and the third inserts 30 may have a length L3 of 10 to 60 cm, for example of 15 to 30 cm.

The inserts 10, 20, 30 can be made of any rigid material, for example a plastics material such as PVC.

The filling method is now described with reference to FIG. 3.

In view A, the tubular body 11 of the first insert 10 is inserted into the compartment 1. The dimensions of the tubular body 11 (notably its cross section) are chosen so as to allow this insertion. The head 12 of the first insert 10 collaborates with the inlet 5 of the compartment 1 to hold the first insert 10 in place and prevent it from fully penetrating and dropping down inside the compartment 1 under the effect of gravity. The dimensions of the head 12 (notably its cross section) are therefore chosen for this purpose.

The particles of catalyst 9 are introduced into the compartment 1 via the longitudinal passage 13 then drop under gravity through the opening 14 of the tubular body 11 of the insert 10 and accumulate in the interior space 2 of the compartment 1.

After a certain length of time, the level of catalyst in the interior space 2 rises and reaches the free end of the tubular body 11 of the insert 10. The catalyst therefore begins to accumulate in the opening 14 of the insert 10 because, owing to its granular nature, the catalyst cannot rise up inside the interior space 2 around the wall of the tubular body 11. When the opening 14 is full of catalyst, the longitudinal passage 13 in turn fills up. View B depicts the insert 10 completely filled with catalyst.

In a following phase, the insert 10 is removed from the compartment 1. As the insert 10 is removed, the catalyst contained in the insert 10 flows into the compartment 1. View C depicts the compartment 1 after the insert 10 has been removed. The depositing of the layer of first catalyst 6 is therefore complete. It is sometimes necessary (depending on the size or geometry of the catalyst for example) to vibrate the insert in order to cause the catalyst to drop down inside the insert. The insert can then be tapped gently on the edge of the tube as it is gradually removed.

The quantity of first catalyst introduced into the layer 6 is adjusted without special metering or weighing. It is the choice of dimensions of the first insert 10 (particularly the length L1 and cross section of the opening 14) that allows the volume of the layer 6 and therefore the quantity of catalyst present to be adjusted with precision.

In a next phase, illustrated in view D, the first insert 10 is reintroduced into the compartment 1 until the free end of the tubular body 11 butts against the layer of first catalyst 6. This phase is a phase of checking the filling of the compartments 1, because all of the first inserts 10 thus introduced into the compartments 1 need to align vertically, at a same distance H1 from the inlet 5 of the compartments 1 (depth gauging). This check can be carried out for example by means of an exterior marking made on each insert (11, 21, 31) that makes it possible to check the height H1 for each insert. Any alignment anomaly indicates incorrect filling, which may then need to be corrected.

Next, the steps depicted in views A, B, C and D can be repeated in a similar way to place the layer of second catalyst 7 and, where applicable, the layer of third catalyst 8, and, where applicable, layers of additional catalysts, the first inserts 10 being replaced by the second inserts 20, then the third inserts 30, and so on. Thus, view E shows the second insert 20 positioned on top of the layer of first catalyst 6 for introducing the second catalyst. The different lengths L1, L2, L3 of the successive inserts are therefore connected to the rise in level of catalyst in the compartments 1 when switching from one insert to the next.

Each catalyst is introduced into the inserts 10, 20, 30 preferably by tipping the catalyst over the heads 12, 22, 32 of the inserts 10, 20, 30. It is advantageous for the heads 12, 22, 32 of the inserts 10, 20, 30 to be contiguous when the inserts 10, 20, 30 are positioned in the reaction compartments 1, i.e. for the empty space between two adjacent heads 12, 22, 32 to be smaller than the size of a particle of catalyst, so as to prevent any particles of catalyst from falling between the inserts 10, 20, 30.

Figure 4:
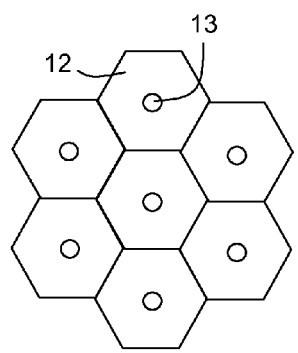
FIG. 4 is a view from above showing the heads of the inserts according to the invention which are inserted into adjacent tubular reaction compartments.

It is therefore preferable for the heads 12, 22, 32 of the inserts 10, 20, 30 to have a polygonal shape (in cross section) suited to the type of array formed by the compartments 1 in the reactor. For example, when the compartments 1 have an equilateral triangle spacing, which they most commonly do, the heads 12, 22, 32 have a hexagonal shape in cross section, as illustrated in FIG. 4.

The transverse dimension of the longitudinal passage 13, 23, 33 (i.e. the diameter in the case of a circular section) is preferably chosen according to the size of catalyst particles, so as to prevent an excessive rate of flow of catalyst in the longitudinal passage 13, 23, 33 which may lead to bypass phenomena caused by the formation of blocks of catalyst. For example, the transverse dimension of the longitudinal passage 13, 23, 33 is chosen as being 1.2 to 2 times the maximum dimension of the catalyst particles.

When the heads 12, 22, 32 of the inserts 10, 20, 30 are contiguous, they form a bearing surface over the compartments 1. This surface is therefore rendered flat by the presence of the heads of the inserts whereas the tube plate itself has numerous irregularities making it difficult to spread the catalyst directly over the tube plate. The granular catalyst can therefore be spread directly over the entirety of this bearing surface, without the need for individual metering for each compartment 1. The catalyst thus spread is then pushed into the various longitudinal passages 13, 23, 33, for example using a whisk broom or a blowing device. A suction system over the bearing surface may be provided to prevent the presence of toxic dust in the surrounding environment.

Figure 5:
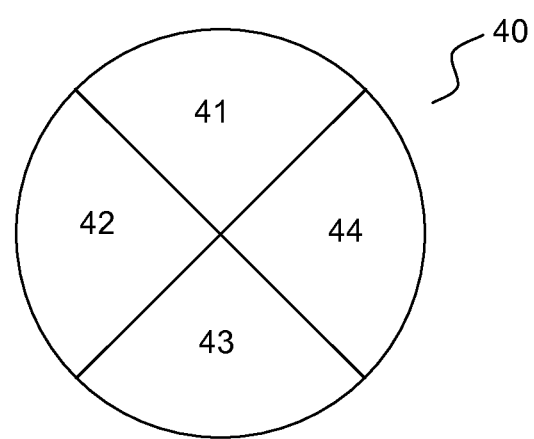
FIG. 5 is a schematic plan view illustrating how the reactor is divided up into sections for the purposes of filling it.

In order to increase the rapidity of the filling operation, it may be beneficial to divide the reactor into sections. For example, with reference to FIG. 5, the reactor 40 of circular cross section may be divided into quarters 41, 42, 43, 44. The division into sections (of which there are two, three, four, five, six or more) may be performed by placing dividing instruments, for example removable partitions, over the compartments 1.

Thus, several different steps of the filling method can be carried out in parallel in the various sections, thus speeding up the filling.

By way of example, at a given moment it is possible:
to introduce the first catalyst into a first section 41 (using the method illustrated in view A of FIG. 3);
to check the uniformity of the layer of first catalyst 6 placed in a second section 42 (by reintroducing the first inserts 10 using the method illustrated in view D of FIG. 3);
to introduce the second catalyst into a third section 43 (by analogy with the method illustrated in view A of FIG. 3), on top of a layer of first catalyst 6 that has already been deposited;
to check the uniformity of the layer of second catalyst 7 deposited in a fourth section 44 (by reintroducing the second inserts 20 in a similar way to that illustrated in view D of FIG. 3).

The invention plans for the heads 12, 22, 32 of the inserts 10, 20, 30 to be visually distinct according to the type of insert. For example, if three types of insert are used, then the heads 12 of the first inserts 10 are visually distinct from the heads 22 of the second inserts 20; the heads 32 of the third inserts 30 are visually distinct from the heads 22 of the second inserts 20; and the heads 12 of the first inserts 10 are visually distinct from the heads 32 of the third inserts 30.

For preference, "visually distinct" means heads of different plain colours. However, it is also possible to conceive of heads bearing different patterns, or provided with distinct accessories (stickers in different colours, different flags, etc.).

That makes it possible to avoid or at the very least immediately identify, visually and in a very simple way, errors that occur during filling (notably the use of the wrong category of insert).

The advantages of the method of the invention are now illustrated in the example which follows compared with a conventional method of filling a multitube reactor.

EXAMPLE

The same industrial reactor, consisting of 15 000 tubes, was filled using the method of the invention and using a conventional method that did not employ the set of inserts as described in the invention but used vibrating machines.

The catalysts (of which there were two) and the filling heights are identical for the two methods.

After the reactor had been completely filled, the quality of fill was checked by measuring the pressure drop across each tube. When the pressure drop measured across the tube differs by more than 8% from the mean of the pressure drops of the tubes of the reactor, this tube is reworked, i.e. emptied then filled again until the same fill is achieved.

Thus, the number of tubes reworked for the filling method according to the invention was 3. By contrast the number of tubes reworked for the conventional filling method was 274 tubes.

The filling method according to the invention also allowed a 30% reduction in filling time, which is considerable for an industrial application.

The invention claimed is:

1. A method for filling a catalytic reactor having a plurality of tubular reaction compartments (1) with an inlet (5) and a closed end (4), the method comprising the following steps:
   a) placing a layer of a first catalyst (6) in the closed end (4) of the tubular reaction compartments (1);
   b) placing a layer of a second catalyst (7) in the tubular reaction compartments (1) on top of the layer of first catalyst (6);
   the first catalyst and the second catalyst being granular catalysts;
   in which:
      step a) involves inserting first inserts (10) into the tubular reaction compartments (1) then introducing the first catalyst into the first inserts (10), each first insert (10) comprising:
         a tubular body (11) configured to be introduced into a tubular reaction compartment (1),
         a head (12) configured to collaborate with the inlet (5) of the tubular reaction compartment (1) to hold the first insert (10) in place,
         the head (12) being provided with a longitudinal through-passage (13) communicating with the inside of the tubular body (11);
      step b) inserting second inserts (20) into the tubular reaction compartments (1) then introducing the second catalyst into the second inserts (20), each second insert (20) comprising:
         a tubular body (21) configured to be introduced into a tubular reaction compartment (1),
         a head (22) configured to collaborate with the inlet (5) of the tubular reaction compartment (1) to hold the second insert (20) in place,
         the head (22) being provided with a longitudinal through-passage (23) communicating with the inside of the tubular body (21);
      the tubular bodies (11) of the first inserts (10) having a longitudinal dimension (L1) greater than the longitudinal dimension (L2) of the tubular bodies (21) of the second inserts (20);
      the heads (12) of the first inserts (10) being visually distinct from the heads (22) of the second inserts (20); and
      the first inserts (10) being removed before the second inserts (20) are inserted.

2. Method according to claim 1, further comprising the following step:
   c) placing a layer of a third catalyst (8) in the tubular reaction compartments (1) on top of the layer of second catalyst (7);
   the third catalyst being a granular catalyst;
   in which:

step c) inserting third inserts (30) into the tubular reaction compartments (1) then introducing the third catalyst into the third inserts (30), each third insert (30) comprising:
a tubular body (31) configured to be introduced into a tubular reaction compartment (1),
a head (32) configured to collaborate with the inlet (5) of the tubular reaction compartment (1) to hold the third insert (30) in place,
the head (32) being provided with a longitudinal through-passage (33) communicating with the inside of the tubular body (31);
the tubular bodies (21) of the second inserts (20) having a longitudinal dimension (L2) greater than the longitudinal dimension (L3) of the tubular bodies (31) of the third inserts (30);
the heads (32) of the third inserts (30) being visually distinct from the heads (12) of the first inserts (10) and from the heads (22) of the second inserts (20); and
the second inserts (20) being removed before the third inserts (30) are inserted.

3. Method according to claim 2, in which the heads (12, 22, 32) of the first, second, and third inserts (10, 20, 30) are different colors.

4. Method according to claim 2, in which the heads (12, 22, 32) of the first, second, and third inserts (10, 20, 30) have a cross section of polygonal shape, and/or in which the heads (12) of the first inserts (10) when the first catalyst is being introduced, the heads (22) of the second inserts (20) when the second catalyst is being introduced, and the heads (32) of the third inserts (30) when the third catalyst is being introduced, are contiguous.

5. Method according to claim 2, in which each step a), b), and c), comprises, after the first, second, or third catalyst has been introduced, the removal of the first, second, or third inserts (10, 20, 30), followed by the reinsertion of the first, second, or third inserts (10, 20, 30) in the tubular reaction compartments (1) butting up against the layer of first catalyst (6), the layer of second catalyst (7) or the layer of third catalyst (8).

6. Method according to claim 2, in which steps a), b), and c) are carried out at least partially concurrently in various tubular reaction compartments (1) of the reactor.

7. Method according to claim 2, in which the reactor (40) is divided into sections (41, 42, 43, 44), each step a), b), and c) being performed simultaneously for all of the tubular reaction compartments (1) of each section (41, 42, 43, 44).

8. Method according to claim 1, in which the heads (12, 22) of the first and second inserts (10, 20) are different colors.

9. Method according to claim 1, in which the heads (12, 22) of the first and second inserts (10, 20) have a cross section of polygonal shape, and/or in which the heads (12) of the first inserts (10) when the first catalyst is being introduced, and the heads (22) of the second inserts (20) when the second catalyst is being introduced, are contiguous.

10. Method according to claim 1, in which each step a) and b) comprises, after the first or second catalyst has been introduced, the removal of the first or second inserts (10, 20), followed by the reinsertion of the first or second inserts (10, 20) in the tubular reaction compartments (1) butting up against the layer of first catalyst (6) or the layer of second catalyst (7).

11. Method according to claim 1, in which steps a) and b) are carried out at least partially concurrently in various tubular reaction compartments (1) of the reactor.

12. Method according to claim 1, in which the reactor (40) is divided into sections (41, 42, 43, 44), each step a) and b) being performed simultaneously for all of the tubular reaction compartments (1) of each section (41, 42, 43, 44).

13. Set of inserts (10, 20, 30) for filling a catalytic reactor having a plurality of tubular reaction compartments (1), the set of inserts (10, 20, 30) comprising first inserts (10) and second inserts (20), in which each first insert (10) and each second insert (20) comprises:
a tubular body (11, 21) configured to be introduced into a tubular reaction compartment (1),
a head (12, 22) configured to collaborate with an inlet (5) of the tubular reaction compartment (1) to hold the insert (10, 20) in place,
the head (12, 22) being provided with a longitudinal through-passage (13, 23) communicating with the inside of the tubular body (11, 21);
the tubular bodies (11) of the first inserts (10) having a longitudinal dimension (L1) greater than the longitudinal dimension (L2) of the tubular bodies (21) of the second inserts (20), and the heads (12) of the first inserts (10) being visually distinct and of different colors from the heads (22) of the second inserts (20).

14. Set according to claim 13, further comprising third inserts (30), in which each third insert (30) comprises:
a tubular body (31) configured to be introduced into a tubular reaction compartment (1),
a head (32) configured to collaborate with an inlet (5) of the tubular reaction compartment (1) to hold the insert (30) in place,
the head (32) being provided with a longitudinal through-passage (33) communicating with the inside of the tubular body (31);
the tubular bodies (21) of the second inserts (20) having a longitudinal dimension (L2) greater than the longitudinal dimension (L3) of the tubular bodies (31) of the third inserts (30), and the heads (32) of the third inserts (30) being visually distinct and of different colors from the heads (12, 22) of the first inserts (10) and of the second inserts (20).

15. Set according to claim 14, in which the heads (12, 22, 32) of the first, second and third inserts (10, 20, 30) have a cross section of polygonal shape, and/or in which the dimensions of the heads (12, 22, 32) of the first inserts, second inserts, and third inserts (10, 20, 30) are such that the heads (12, 22, 32) are contiguous when the first, second, and third inserts (10, 20, 30) are inserted into adjacent tubular reaction compartments (1).

16. Set according to claim 13, in which the heads (12, 22) of the first and second inserts (10, 20) have a cross section of polygonal shape, and/or in which the dimensions of the heads (12, 22) of the first inserts and second inserts (10, 20) are such that the heads (12, 22) are contiguous when the first and second inserts (10, 20) are inserted into adjacent tubular reaction compartments (1).

* * * * *